(12) United States Patent
Kushtagi et al.

(10) Patent No.: US 8,787,941 B2
(45) Date of Patent: Jul. 22, 2014

(54) PROHIBITING ELECTRONIC DEVICE USAGE BASED ON GEOGRAPHICAL LOCATION

(75) Inventors: Harsha Raghavendra Kushtagi, Karnataka (IN); Manjunath Bharadwaj Subramanya, Karnataka (IN); Neeraj Kumar Chauhan, Karnataka (IN)

(73) Assignee: Longsand Limited (GB)

( * ) Notice: Subject to any disclaimer, the term of this patent is extended or adjusted under 35 U.S.C. 154(b) by 10 days.

(21) Appl. No.: 13/563,261

(22) Filed: Jul. 31, 2012

(65) Prior Publication Data

US 2014/0038577 A1    Feb. 6, 2014

(51) Int. Cl.
*H04W 24/00*    (2009.01)

(52) U.S. Cl.
USPC ............... 455/456.4; 455/410; 455/456.1; 455/420

(58) Field of Classification Search
USPC .......... 455/410, 411, 414.1, 418–420, 456.4, 455/456.1, 26.1
See application file for complete search history.

(56) References Cited

U.S. PATENT DOCUMENTS

| | | | |
|---|---|---|---|
| 7,272,403 B2 * | 9/2007 | Creamer et al. | 455/456.1 |
| 7,460,866 B2 * | 12/2008 | Salkini et al. | 455/431 |
| 7,912,451 B2 | 3/2011 | Eckhart | |
| 8,346,248 B2 * | 1/2013 | Howarter et al. | 455/431 |
| 8,437,776 B2 * | 5/2013 | Busch | 455/456.1 |
| 2003/0134626 A1 * | 7/2003 | Himmel et al. | 455/419 |
| 2005/0181808 A1 * | 8/2005 | Vaudreuil | 455/456.3 |
| 2007/0042772 A1 * | 2/2007 | Salkini et al. | 455/431 |
| 2007/0129083 A1 * | 6/2007 | Creamer et al. | 455/456.1 |
| 2007/0149214 A1 * | 6/2007 | Walsh et al. | 455/456.1 |
| 2008/0160984 A1 * | 7/2008 | Benes et al. | 455/419 |
| 2009/0005061 A1 * | 1/2009 | Ward et al. | 455/456.1 |
| 2009/0082001 A1 * | 3/2009 | Rahul et al. | 455/418 |
| 2009/0231998 A1 | 9/2009 | Bharadwaj et al. | |
| 2009/0325566 A1 * | 12/2009 | Bell et al. | 455/419 |
| 2010/0130167 A1 * | 5/2010 | Bennett et al. | 455/411 |
| 2010/0184422 A1 * | 7/2010 | Ahrens | 455/419 |
| 2011/0117927 A1 * | 5/2011 | Doyle | 455/456.1 |
| 2011/0269436 A1 * | 11/2011 | Porco | 455/414.1 |
| 2012/0214470 A1 * | 8/2012 | Tadayon et al. | 455/418 |
| 2012/0252430 A1 * | 10/2012 | Imes et al. | 455/418 |
| 2012/0284779 A1 * | 11/2012 | Ingrassia et al. | 726/5 |
| 2012/0303446 A1 * | 11/2012 | Busch | 705/14.45 |
| 2013/0040629 A1 * | 2/2013 | Sprigg et al. | 455/419 |
| 2013/0084885 A1 * | 4/2013 | Jain et al. | 455/456.1 |
| 2013/0095859 A1 * | 4/2013 | De Vries | 455/456.3 |

OTHER PUBLICATIONS

Tasker for Android, "Tasker: Total Automation for Android," Available at http://tasker.dinglisch.net/index.html, (last accessed on Jul. 28, 2012).

\* cited by examiner

*Primary Examiner* — Lester Kincaid
*Assistant Examiner* — Mehmood B Khan

(57) ABSTRACT

A system and method for prohibiting electronic device usage based on geographical location are provided herein. In examples, a geographical location of the electronic device is determined. Any policies associated with the geographical location of the electronic device are determined, and the policy may be obtained from a remote location. The functions of the electronic device are disabled based on the policy.

18 Claims, 4 Drawing Sheets

200

PROHIBITING ELECTRONIC DEVICE USAGE BASED ON GEOGRAPHICAL LOCATION

BACKGROUND

The use of electronic devices such as cellular phones, tablets, and laptops at certain geographical locations may be inappropriate and distracting to others within the same environment. Furthermore, in certain geographical locations, using electronic devices under some conditions may be illegal. Some attempts to prohibit the use of electronic devices while at or near certain geographical locations make use of separate hardware other than that of the electronic device to block the functionality of the electronic device. For example, the separate hardware may send various signals to the electronic device in order to disable certain functionalities of the electronic device.

BRIEF DESCRIPTION OF THE DRAWINGS

Certain examples are described in the following detailed description and in reference to the drawings, in which.

DETAILED DESCRIPTION OF SPECIFIC EXAMPLES

As discussed above, attempts to prohibit the use of electronic devices based on geographical location have traditionally focused on disabling the various functionality of the device using hardware that is external to the electronic device. As used herein, functions or functionality refers to any capability of the electronic device presently available or developed in the future. For example, the functions of the electronic device may include, but are not limited to, telephone, internet access, music player, video player, camera, and gaming. The pervasive use of electronic devices such as mobile phones has led to such devices being easily used for inappropriate activity. For example, the camera and the microphone may be used in order to secretly photograph or film videos during inappropriate situations or in sensitive geographical locations, such as restrooms and other intimate areas where privacy may be expected. In other examples, the camera and the microphone of the electronic device enables discrete video recording at movie theaters or music concerts, where recordings of the performances are illegal or are otherwise discouraged.

Traditionally, hardware such as jammers or electronic circuitry that produces infrared signals is used to disable functions of the electronic device. A jammer prevents electronic devices from receiving incoming signals, while electronic circuitry can be used to produce infrared signals encoded with commands that can disable the electronic device. By using jammers or electronic circuitry that produces infrared signals in order to prohibit use of electronic devices, traditional techniques typically do not take advantage of the hardware already present in an electronic device. For example, cellular phones are usually equipped with global positioning system receivers and other hardware that may be used to determine the geographical location of the electronic device. The device may be disabled based on the geographical location of the device.

Embodiments described herein relate generally to techniques for prohibiting electronic device usage based on geographical location. More specifically, systems and methods described herein relate to prohibiting electronic device usage based on geographical location by accessing hardware that is already present in the electronic devices. Furthermore, use of the electronic device is prohibited by blocking certain functions of the electronic device.

Figure 1:
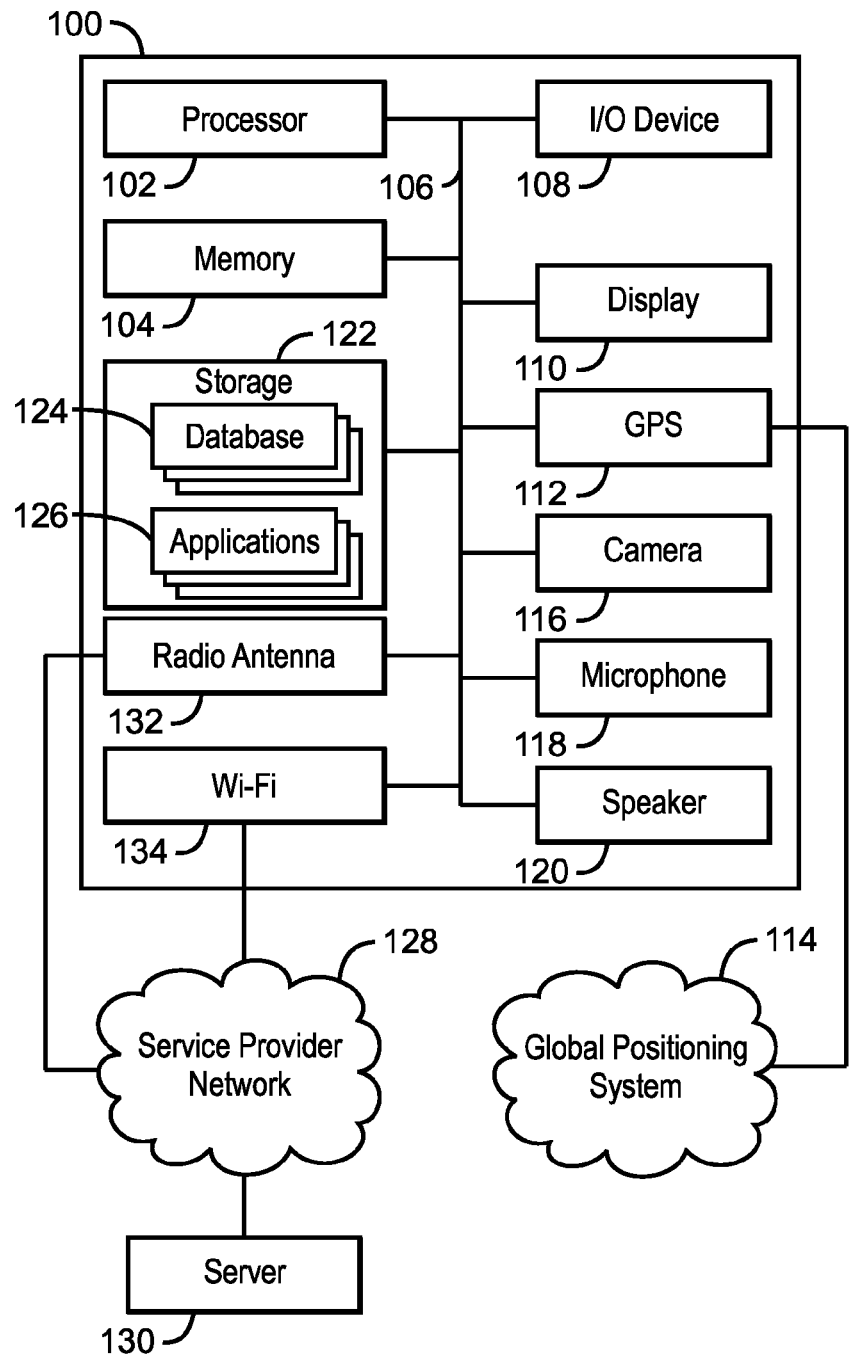
FIG. 1 is a block diagram of an electronic device, in accordance with examples.

FIG. 1 is a block diagram of an electronic device 100, in accordance with examples. The electronic device 100 may be any type of computing device, such as a mobile phone, laptop computer, or tablet computer, among others. The electronic device 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory (RAM), read only memory (ROM), flash memory, or any other suitable memory systems. The instructions that are executed by the processor 102 may be used to determine a geographical location of the electronic device, determine if there is a policy associated with the geographical location of the electronic device, obtain the policy from a remote location, and disable functions of the electronic device based on the policy.

The processor 102 may be connected through a bus 106 to an input/output (I/O) device 108 adapted to allow a user to interact with the electronic device 100. The I/O device 108 may include, for example, a keyboard and a pointing device, wherein the pointing device may include a touchpad or a touchscreen, among others. In examples, the I/O device 108 may be a touchscreen that includes a virtual keyboard that is rendered on the touchscreen. Additionally, in examples, the I/O device 108 may be externally connected to the electronic device 100, or the I/O device 108 may be internal to the electronic device 100.

The processor 102 may also be linked through the bus 106 to a display 110 adapted to render the output of the electronic device 100. In examples, the display 110 may be a display screen that is external to the electronic device 100. Additionally, in examples, the display 110 and the I/O device may be combined into one touchscreen. In examples, the display 110 may be used for video playback or gaming on the electronic device 100.

A global positioning system (GPS) receiver 112 may be connected to the bus 106 within the electronic device 100. However in some examples, the GPS receiver 112 may be external to the electronic device 100. Additionally, in examples, the GPS receiver 112 may include, but is not limited to, an antenna, a clock, and a processor. The GPS receiver 112 may wirelessly communicate with the global positioning system 114 to determine geographical location information associated with the electronic device 100. The GPS receiver may then provide the geographical location information to other components of the electronic device 100. In examples, any number of signals from any number of satellites can be used in the calculations to determine the geographical location of the GPS receiver 112. For ease of description, FIG. 1 has been described using GPS as an example. However, any appropriate geographic location identification system may be used to determine the geographical location of the electronic device 100. Thus, the present techniques should not be limited to GPS, but rather the present techniques include any appropriate geographic location identification system presently in use or developed in the future.

In examples, triangulation may also or alternatively be used to determine the geographical location of the electronic device. Triangulation is a technique in which an unknown point is determined from angles that are subtended from known points. In examples, the base stations of the service network provider, such as a service network provider 124 (FIG. 1), may be used to provide the known points, while the electronic device can provide the unknown point. Triangulation may be used to determine the geographical location of the unknown point, or the electronic device. In examples, other network based mobile phone tracking methods, such as multilateration and forward link timing, may be used to determine the geographical location of the electronic device.

A camera 116 and a microphone 118 may be connected to the bus 106 within the electronic device 100. In various examples, the camera 116 is used to capture still images and video. The microphone may be used to capture audio associated with a video captured by the camera 116. In examples, the microphone 116 is used to capture an audio signal without any corresponding video signal.

The electronic device 100 may also include a speaker 120. The speaker 120 may be used to provide a user with an auditory alert that various events have occurred. For example, when the electronic device 100 is a cellular phone, the speaker 120 may issue an auditory alert that signifies an incoming telephone call. In examples, the speaker 120 may also issue an auditory alert that signifies an incoming text message or email. The speaker 120 may also be used for music playback functions or to play the audio associated with a video.

The electronic device 100 also includes a storage device 122. The storage device 122 can include a hard drive, an optical drive, a thumb drive, an array of drives, a removable memory card, or any combinations thereof. The storage device 122 may include one or more databases 124 and one or more applications 126. The applications 126 may include an application that prohibits the use of electronic devices based on geographical location. In examples, the databases 124 may include policies that describe the prohibited actions which are used to determine which functions of the electronic device to disable based on the geographical location of the electronic device. The policies may be implemented by the application 126 that prohibits the use of electronic devices based on geographical location. Furthermore, the databases 124 may include user-created policies that are implemented by the application 126 that prohibits the use of electronic devices based on geographical location. Accordingly, the databases 124 include geographical locations and policies associated with the geographical locations.

In addition to prohibited actions, the policies may also include actions to be taken by the application 126 that prohibit the use of electronic devices based on geographical location if a user attempts to override the policy. Further, the policy may include a flag or other indication of whether the policy can be overridden. In examples, the databases 124 can be updated using a service provider network 128 to include policies for the geographical locations of the electronic device within a predetermined range. For example, the databases 124 can include the policies for geographical locations within fifty miles of the electronic device. In this manner, the policies may be used to prohibit device usage even when the electronic device does not have access to the service provider network 128.

In examples, the electronic device 100 is connected to a remote server 130, e.g., via the service provider network 128. Additionally, in examples, the policies are located on the remote server 130. The policies may be pushed from the remote server 130 to the electronic device 100. When pushing the policies to the electronic device, the remote server 130 may send the policies to the electronic device. Similarly, the electronic device 100 may pull the policies from the remote server 130 be requesting the policies from the remote server 130. The application 126 that prohibits the use of electronic devices based on geographical location may obtain the policies from the remote server 130 and disable functions of the electronic device 100 based on the policies.

The service provider network 128 includes a number of base stations that include radio towers. The radio towers within the service provider network 128 may be used to receive signals from electronic devices that access the service provider network 128. Accordingly, the electronic device 100 may send signals to the service provider network 128 using a radio antenna 132. In the case of a cellular phone, the service provider network 128 may connect telephone calls from the cellular phone to another service provider network or to a land-line telephone network in order to complete the call.

Each base station of the service provider network may also possess wireless networking capabilities to allow the electronic device 100 to send and receive data. In examples, the wireless networking capabilities may be a Wi-Fi system. Accordingly, the electronic device 100 may send data to the service provider network using a Wi-Fi antenna 134. The Wi-Fi antenna 134 may also receive data from the service provider network 128. In examples, the data received using the Wi-Fi antenna is used to create or update the databases 124 within storage 120. Additionally, in examples, the Wi-Fi antenna 134 may be used to determine an internet protocol (IP) address of the electronic device 100. The IP address of the electronic device 100 may also or alternatively be used to determine the geographical location of the electronic device 100.

It is to be understood that the block diagram of FIG. 1 is not intended to indicate that the electronic device 100 is to include all of the components shown in FIG. 1. Further, the electronic device 100 may include any number of additional components not shown in FIG. 1, depending on the design details of a specific implementation.

Figure 2:
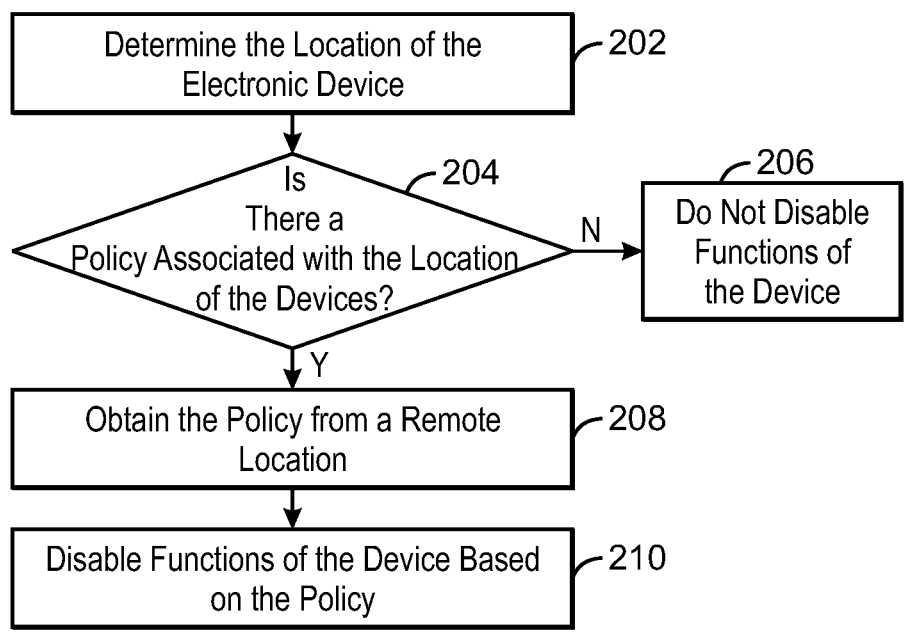
FIG. 2 is a process flow diagram of a method for prohibiting electronic device usage based on geographical location, in accordance with examples.

FIG. 2 is a process flow diagram of a method 200 for prohibiting electronic device usage based on geographical location, in accordance with examples. At block 202, a geographical location of the electronic device is determined. As discussed above, the geographical location may be determined using a GPS system, triangulation, or other appropriate technique that uses the hardware of the device.

At block 204, it is determined if there are any policies associated with the geographical location of the electronic device. If there is not a policy associated with the geographical location, process flow continues to block 206. If there is a policy associated with the geographical location, process flow proceeds to block 208. In examples, when determining if there are any policies associated with the geographical location of the remote device, the policies may be previously obtained from a remote location and stored in a database stored on the electronic device. Additionally, in examples, the policies may be found at the remote location. The remote location may be any device capable of storing policies that is separate from the electronic device. For example, the remote location may be a networked storage device, a remote server, or another computing device.

At block 206, functions of the electronic device are not disabled. Accordingly, a user of the electronic device is able to freely use the functionality of the electronic device. At block 208, the policy may be obtained from a remote location. In examples, the policies may be downloaded from a remote location to the electronic device. Additionally, in examples, the electronic device can send a request for the policy to the remote location. Further, policies may be downloaded for locations within a pre-determined range of the geographical location of the electronic device.

At block 210, portions or all of the functions of the electronic device are disabled based on the policy. The policy is used to disable functions of the electronic device without initiating or executing the applications associated with various functions of the electronic device. For example, if the electronic device is located within a confidential area, such as a government office, the policy associated with the location may include audio capture, video capture, audio playback, and video playback as prohibited activity. Accordingly, in response to the policy, functions such as audio capture, video capture, audio playback, and video playback are disabled on the electronic device, while other functions may remain enabled. The audio capture, video capture, audio playback, and video playback functions are not initiated or executed in order to disable their functionality. Rather, the policy is used to disable the functionalities based on geographical location, without executing the functions of the electronic device.

In other examples, the electronic device may be located in a sensitive area, such as a doctor's office. The policy for the geographical location associated with the doctor's office may prohibit all image capture. Accordingly, within the doctor's office the associated policy is used to disable any image capture capability of the electronic device, such as a camera 116 (FIG. 1). Further, in examples, when the electronic device is located in a movie theater or music concert, the policy may include prohibiting video capture functions present in the electronic device. Accordingly, any video capture capability of the electronic device, such as a camera 116 (FIG. 1), may be disabled in response to the associated policy.

In examples, a user may create a user created policy or set of user created policies to prohibit use of the electronic device at certain geographical locations. For example, the user may pinpoint a particular geographical location, and then create a user created policy including any prohibited actions based of the user selected geographical location. For example, a user may select the user's work site as a geographical location for which the user wishes to create a user created policy for a cellular phone. The geographical location may be saved in a database, such as the database 124 (FIG. 1). The user may then select a list of functions that are prohibited at the user selected geographical location. In this manner, the electronic device may disable functions of the phone automatically when the user reaches the associated work geographical location, without manually changing the settings of the electronic device.

Figure 3:
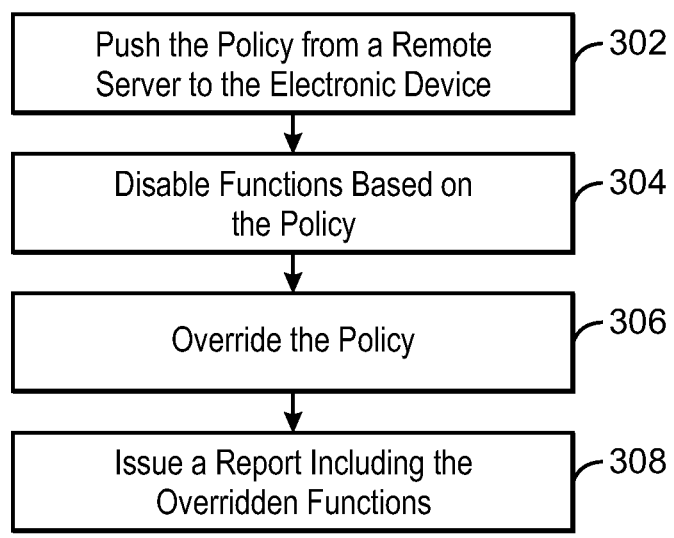
FIG. 3 is a process flow diagram of a method for prohibiting electronic device usage based on geographical location policies on a remote server, in accordance with examples.

FIG. 3 is a process flow diagram of a method 300 for prohibiting electronic device usage based on geographical location policies on a remote server, in accordance with examples. At block 302, the policy associated with a geographical location of an electronic device may be pushed from a remote server to the electronic device. In examples, the policy may be obtained through data supplied by one of a third party, governmental agency, or any combination thereof. A third party may be any entity that has an interest in disabling functions of an electronic device, such as a corporation, doctor's office, or a movie theater. Various policies that correspond to hospitals, government agencies, or movie theaters, for example, can be loaded into a database on the electronic device or on the remote server. As the user travels to various geographical locations with the electronic device, functionality of the electronic device may be automatically updated without any action from the user. In embodiments, a user may further supplement the policies as they are defined in the database on the electronic device or the database on the remote server. For example, if the policy at a movie theater location disables video capture functions of the electronic device, a user may supplement the policy by creating a user created policy to disable the speakers and text message functions of the electronic device. The user created policy may be implemented in addition to the general movie theater policy. In this manner, the electronic device is automatically disabled from recording movies at the theater in violation of the movie theater rules. Further, the electronic device is automatically silenced to comport with socially acceptable behavior in a movie theater as desired by the user.

At block 304, functions of the electronic device are disabled based on the policy. At block 306, the policy may be overridden. In the event that the policy is overridden, the electronic device can be used as if no policy prohibiting use of the electronic device was available for the present geographical location. In examples, the policy includes a flag that enables the policy to be overridden. If the flag designates that the policy cannot be overridden, then the features designated as prohibited in the policy will not be overridden.

At block 308, a report may be issued that includes the overridden functions. The report may include an identification of the electronic device along with an indication of which prohibited functions were overridden. In the event of a data breach, users who have overridden the prohibited functions of the electronic device may be identified.

Figure 4:
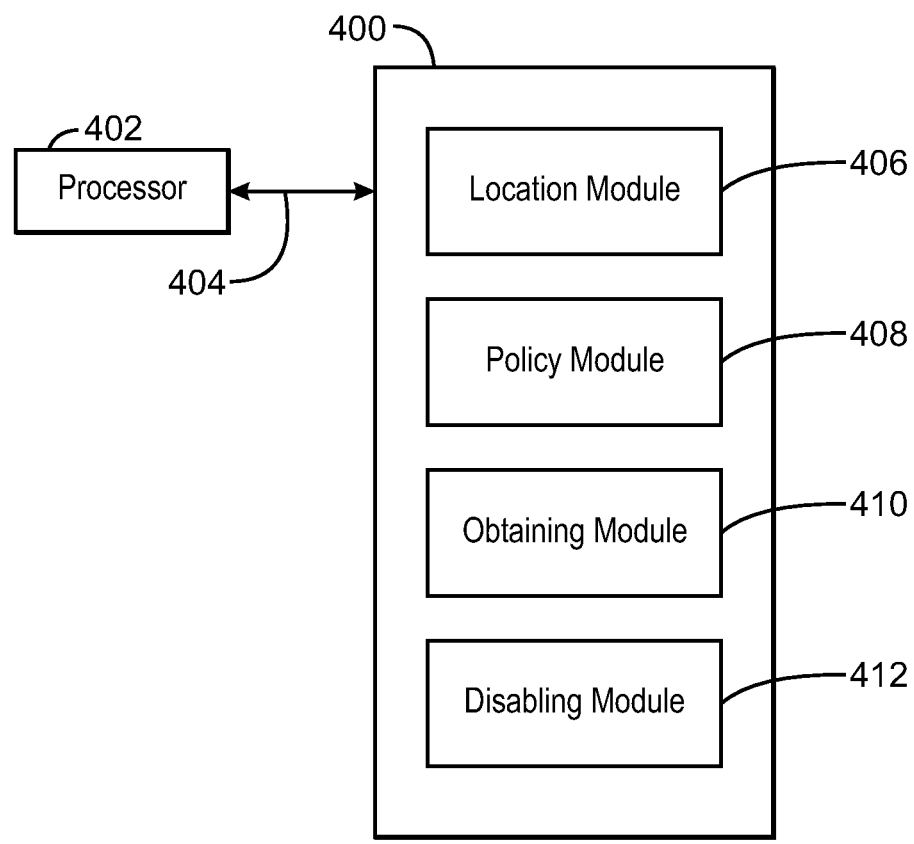
FIG. 4 is a block diagram showing a tangible, non-transitory, computer-readable medium that prohibits electronic device usage based on geographical location, in accordance with examples.

FIG. 4 is a block diagram showing a tangible, non-transitory, computer-readable medium 400 that prohibits electronic device usage based on geographical location, in accordance with examples. The computer-readable medium 400 may be accessed by a processor 402 over a computer bus 404. Furthermore, the computer-readable medium 400 may include code to direct the processor 402 to perform the steps of the current method.

The various software components discussed herein may be stored on the tangible, non-transitory, computer-readable medium 400, as indicated in FIG. 4. For example, a location module 406 may be configured to direct the processor 402 to determine a geographical location of the electronic device. In examples, the location module also transmits the geographical location of the electronic device to a remote location, such as a remote server. A policy module 408 may be configured to direct the processor 402 to determine if there is a policy associated with the geographical location of the electronic device. In examples, the policies may be located in a database on the electronic device or at a remote location. In addition, the policies may be user created policies that are created by a user for various geographical locations as selected by the user. An obtaining module 410 may obtain the policy from a remote location. A disabling module 412 may be configured to direct the processor 402 to disable functions of the electronic device based on the policy. In examples, the disabling module 410 is also configured to direct the processor 402 to obtain the policy from the remote server.

It is to be understood that FIG. 4 is not intended to indicate that all of the software components discussed above are to be included within the tangible, non-transitory, computer-readable medium 400 in every case. Further, any number of additional software components not shown in FIG. 4 may be included within the tangible, non-transitory, computer-readable medium 400, depending on the specific implementation. For example, geographical location module may be used to determine the geographic geographical location of the electronic device.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A method for prohibiting electronic device usage based on geographical location, comprising:
   determining a geographical location of the electronic device;
   determining if there is a policy associated with the geographical location of the electronic device;
   obtaining the policy from a remote location;
   disabling functions of the electronic device based on the policy, without executing the functions of the electronic device;
   indicating if the disabled functions were overridden;
   overriding the disabled functions; and
   issuing a report including the overridden functions.

2. The method of claim 1, wherein a user created policy is included in a database on the electronic device.

3. The method of claim 1, wherein the policy is included on a remote server and pushed to the electronic device.

4. The method of claim 1, wherein the policy is obtained from the remote location through data supplied by one of a third party, governmental agency, or any combination thereof.

5. The method of claim 1, wherein the functions of the electronic device include telephone, internet access, music player, video player, camera, and gaming.

6. The method of claim 1, comprising overriding the disabling functions.

7. The method of claim 1, wherein an internet protocol address is used to determine the geographical location of the electronic device.

8. A system for prohibiting electronic device usage based on geographical location, comprising:
   a processor that is adapted to execute stored instructions; and
   a storage device that stores instructions, the storage device comprising processor executable code that, when executed by the processor, is adapted to:
   determine a geographical location of the electronic device;
   transmit the geographical location of the electronic device to a remote server;
   determine if there is a policy associated with the geographical location of the electronic device present on the remote server;
   transmit the policy from the remote server to the electronic device;
   disable functions of the electronic device based on the policy without executing the functions of the electronic device;
   indicate if the disabled functions were overridden
   overriding the disabled functions of the electronic device; and
   issuing a report including the overridden functions.

9. The system of claim 8, wherein the policy includes prohibited uses of the electronic device that are obtained from one of a third party, governmental agency, or any combination thereof.

10. The system of claim 8, wherein the functions of the electronic device include telephone, internet access, music player, video player, camera, and gaming.

11. The system of claim 8, wherein the disabled functions of the electronic device are overridden.

12. The system of claim 8, wherein an internet protocol address is used to determine the geographical location of the electronic device.

13. The system of claim 8, comprising a global positioning system receiver, wherein the global positioning system receiver is used to determine a geographical location of the electronic device.

14. The system of claim 8, wherein triangulation is used to determine a geographical location of the electronic device.

15. A tangible, non-transitory, computer-readable medium comprising code to direct a processor to:
   determine a geographical location of an electronic device;
   determine if there is a policy associated with the geographical location of the electronic device;
   obtain the policy from a remote location;
   disable functions of the electronic device based on the policy without executing the functions of the electronic device;
   indicating if the disabled functions were overridden
   overriding the disabled functions of the electronic device; and
   issuing a report including the overridden functions.

16. The tangible, non-transitory, computer-readable medium of claim 15, wherein a user created policy is included in a database on the electronic device.

17. The tangible, non-transitory, computer-readable medium of claim 15, wherein the policy is included on a remote server and pushed to the electronic device.

18. The tangible, non-transitory, computer-readable medium of claim 15, wherein the policy is obtained from the remote location through data supplied by one of a third party, or governmental agency, or any combination thereof.

* * * * *